(12) United States Patent
Shingu et al.

(10) Patent No.: US 11,334,706 B2
(45) Date of Patent: May 17, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Jun Shingu, Kanagawa (JP); Qianru Qiu, Kanagawa (JP); Atsushi Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 319 days.

(21) Appl. No.: 16/211,251

(22) Filed: Dec. 6, 2018

(65) Prior Publication Data

US 2019/0266220 A1   Aug. 29, 2019

(30) Foreign Application Priority Data

Feb. 23, 2018   (JP) .............................. JP2018-030997

(51) Int. Cl.
*G06F 40/103* (2020.01)
*G06Q 10/10* (2012.01)
*G06F 40/169* (2020.01)

(52) U.S. Cl.
CPC .......... *G06F 40/103* (2020.01); *G06F 40/169* (2020.01); *G06Q 10/107* (2013.01)

(58) Field of Classification Search
CPC .... G06F 40/103; G06F 40/168; G06F 40/169; G06Q 10/107
See application file for complete search history.

(56) References Cited

U.S. PATENT DOCUMENTS

| | | | |
|---|---|---|---|
| 7,761,507 B2 | 7/2010 | Herf et al. | |
| 8,775,513 B2 | 7/2014 | Hind et al. | |
| 8,788,698 B2 | 7/2014 | Hind et al. | |
| 9,497,041 B2 | 11/2016 | Hind et al. | |
| 10,126,927 B1* | 11/2018 | Fieldman | G06F 3/1454 |
| 10,129,188 B2* | 11/2018 | Liu | G06F 16/958 |
| 2008/0276184 A1* | 11/2008 | Buffet | G06F 30/00 715/752 |
| 2013/0117378 A1* | 5/2013 | Kotorov | G06Q 50/01 709/205 |
| 2014/0053084 A1* | 2/2014 | Kim | G06Q 10/101 715/753 |
| 2014/0344721 A1* | 11/2014 | Prakash | H04L 61/6077 715/753 |
| 2014/0372540 A1* | 12/2014 | Libin | H04L 12/1822 709/206 |
| 2015/0309720 A1* | 10/2015 | Fisher | G06F 3/04842 715/752 |
| 2017/0032470 A1* | 2/2017 | Watanachote | G06Q 10/067 |
| 2017/0337176 A1* | 11/2017 | Cietwierkowski | G06F 40/253 |
| 2019/0190865 A1* | 6/2019 | Jeon | G06K 9/00228 |

FOREIGN PATENT DOCUMENTS

| | | |
|---|---|---|
| JP | 2001344184 | 12/2001 |
| JP | 2007518146 | 7/2007 |
| JP | 2009013721 | 1/2009 |

* cited by examiner

*Primary Examiner* — Tadesse Hailu
(74) *Attorney, Agent, or Firm* — JCIPRNET

(57) ABSTRACT

An information processing apparatus includes a display that displays a message, and an association unit that associates a first message including an image with a second message that includes a character string that is entered in a state that an original image of the image is displayed via the image on the display.

21 Claims, 16 Drawing Sheets

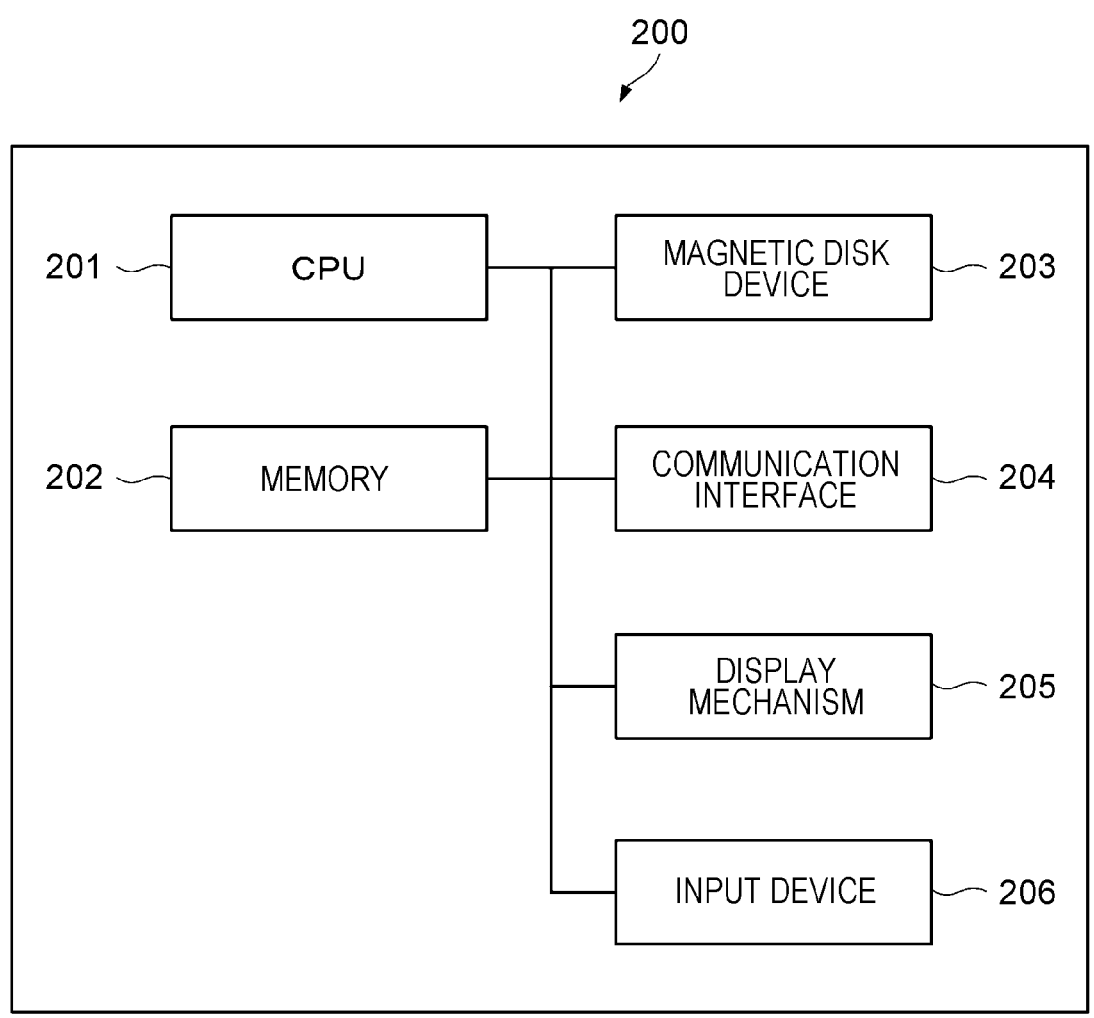

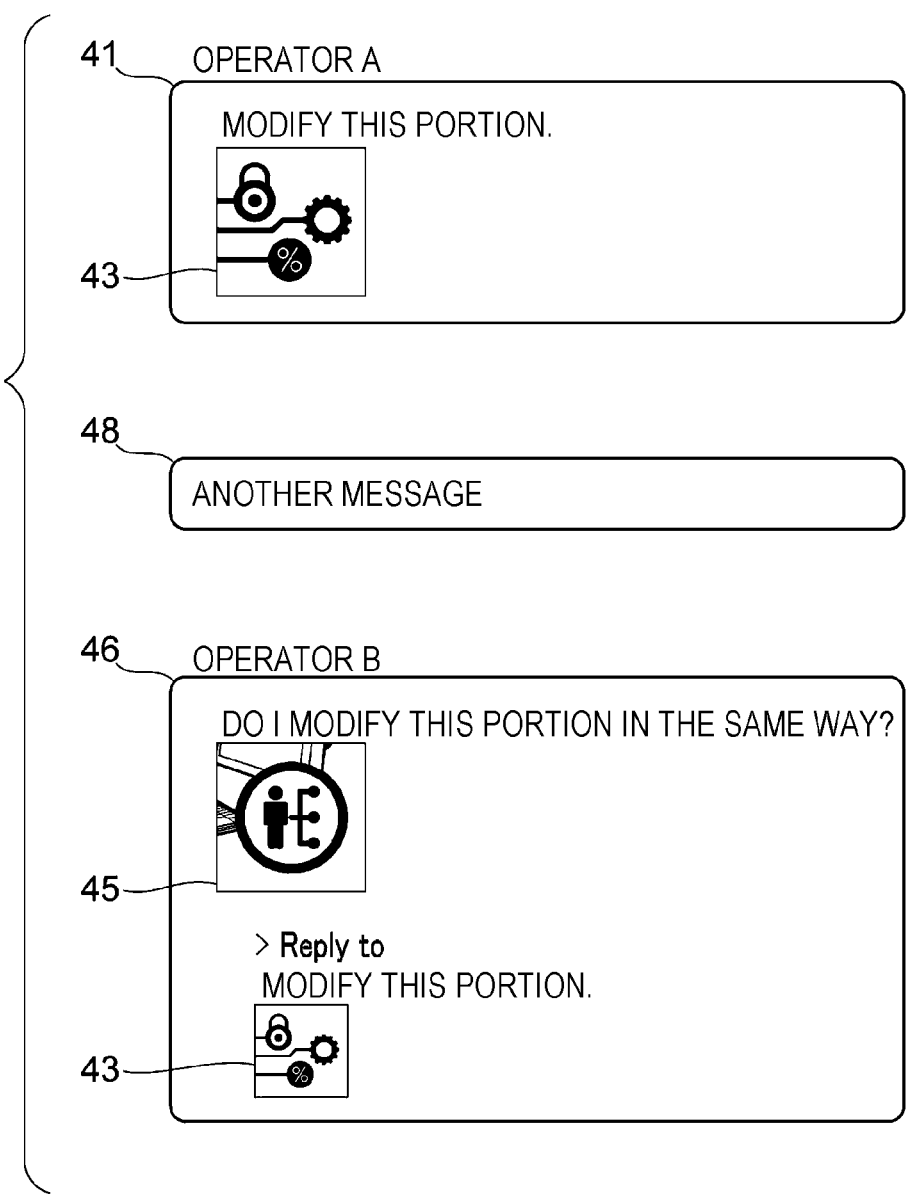

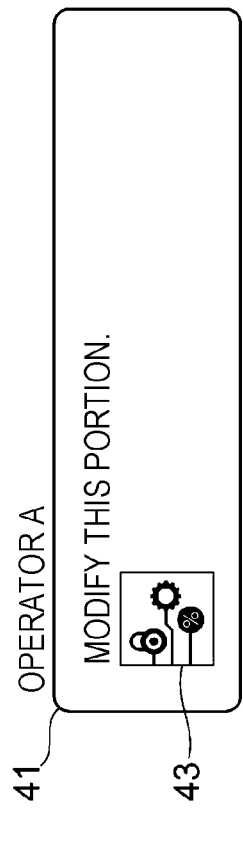
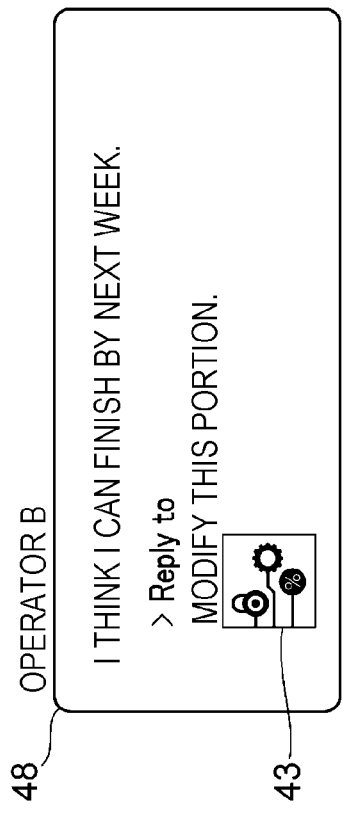
FIG. 10A
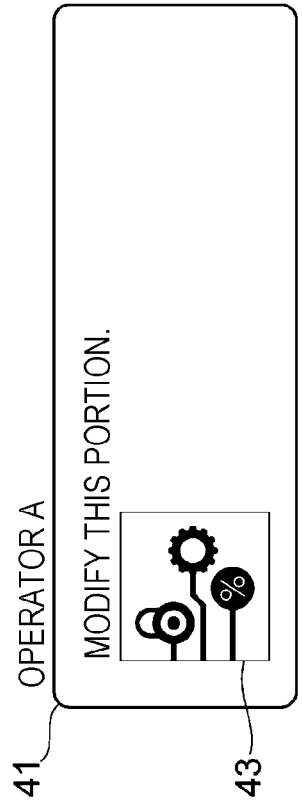
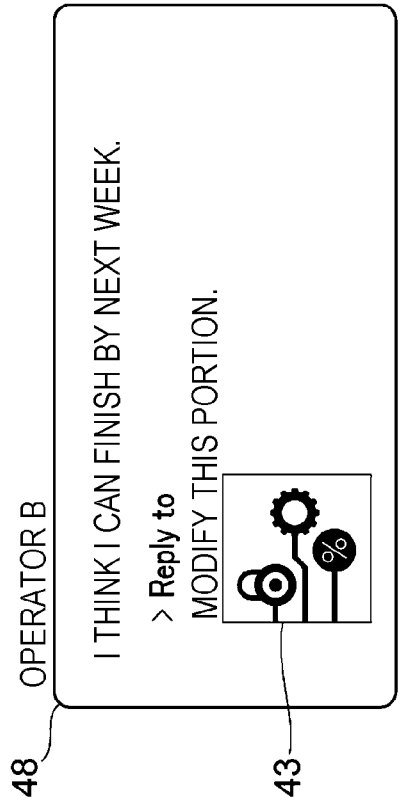
FIG. 10B

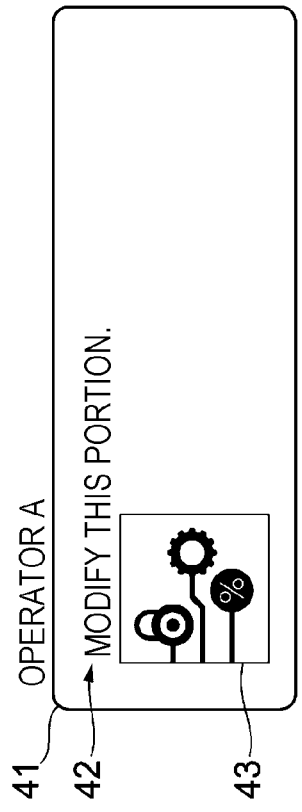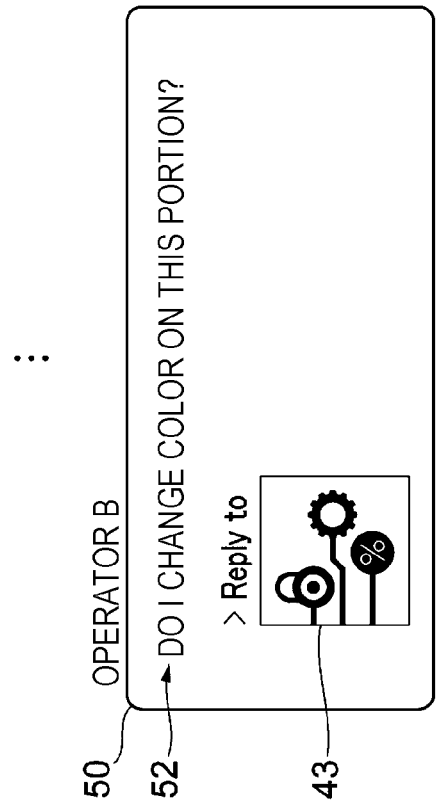
FIG. 11A
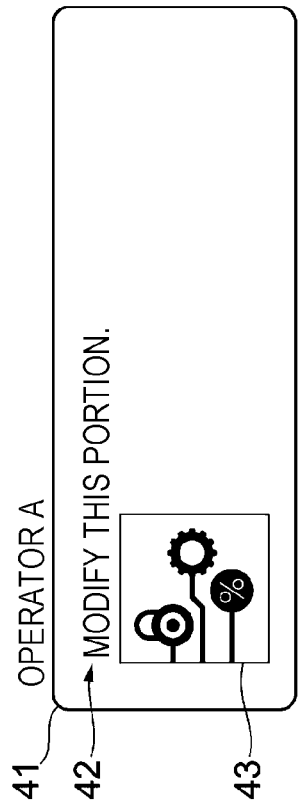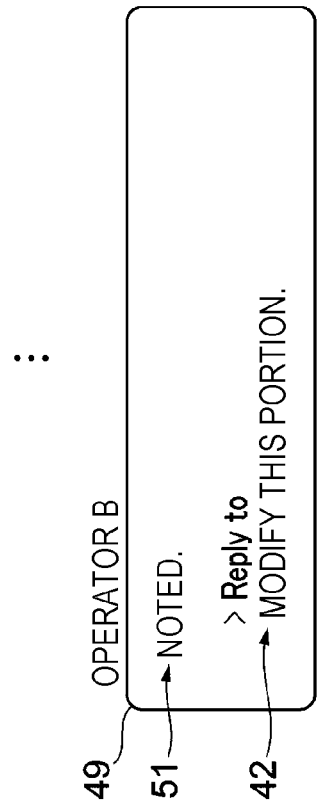
FIG. 11B

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-030997 filed Feb. 23, 2018.

BACKGROUND

(i) Technical Field

The present invention relates to an information processing apparatus and a non-transitory computer readable medium.

(ii) Related Art

Messages are displayed in a chat system, and one message including an image may be associated with another message. A user may enter a character string of another message after verifying contents of an original image of the image included in the message. In that case, the user may have difficulty if the original image is not displayed.

SUMMARY

According to an aspect of the invention, there is provided an information processing apparatus. The information processing apparatus includes a display that displays a message, and an association unit that associates a first message including an image with a second message that includes a character string that is entered in a state that an original image of the image is displayed via the image on the display.

BRIEF DESCRIPTION OF THE DRAWINGS

Exemplary embodiment of the present invention will be described in detail based on the following figures, wherein:

FIG. 2 illustrates a hardware configuration of an operation terminal of the exemplary embodiment;

FIG. 6-2A and FIG. 6-2B illustrate a specific process that generates the link information by displaying the original image of the image if the image is contained in the one message;

FIG. 6-3A and FIG. 6-3B illustrate a specific process that generates the link information by displaying the original image of the image if the image is contained in the one message;

FIG. 8A and FIG. 8B illustrate a second display example of the reply message;

FIG. 10A and FIG. 10B illustrate a fourth display example of the reply message; and FIG. 11A and FIG. 11B illustrate a fifth display example of the reply message.

DETAILED DESCRIPTION

An exemplary embodiment of the present invention is described in detail with reference to the attached drawings.

Figure 1:
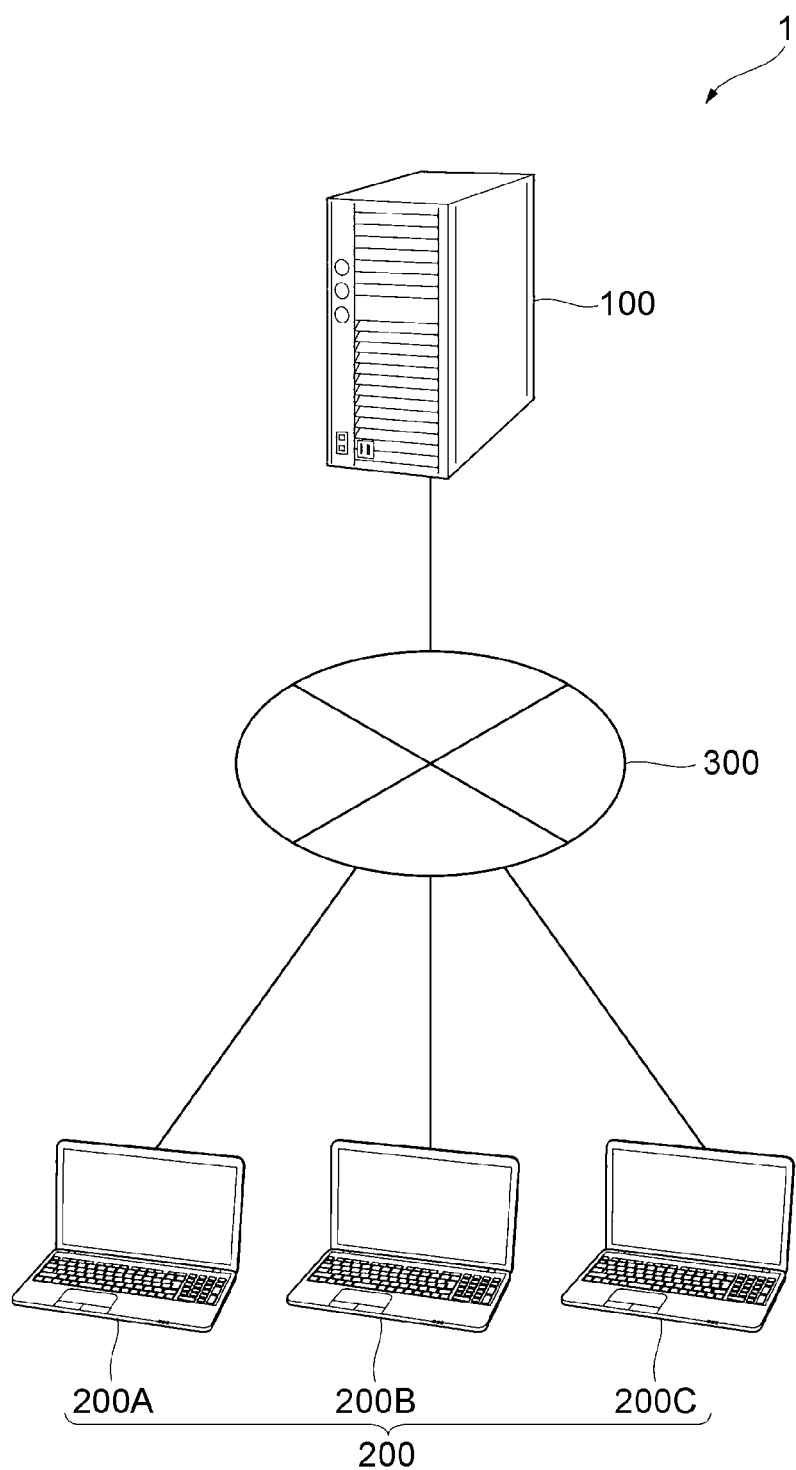
FIG. 1 illustrates a whole configuration of a chat system of an exemplary embodiment.

The whole configuration of a chat system 1 of the exemplary embodiment of the present invention is described below. FIG. 1 illustrates the whole configuration of the chat system 1 of the exemplary embodiment. As illustrated in FIG. 1, the chat system 1 includes a server apparatus 100 and operation terminals 200A through 200C. The server apparatus 100 and the operation terminals 200A through 200C are connected to a network 300.

FIG. 1 illustrates the operation terminals 200A through 200C. If the operation terminals 200A through 200C are not discriminated from each other, they may be collectively referred to as an operation terminal 200. In the example of FIG. 1, the three operation terminals 200 are illustrated, but the number of operation terminals is not limited to three.

The server apparatus 100 is a computer that provides a chat system 1 that allows multiple operation terminals 200 to exchange messages. The server apparatus 100 may be a personal computer (PC), a workstation, or the like. Upon receiving a message from the operation terminal 200, the server apparatus 100 stores the message. The server apparatus 100 transmits the received message to the operation terminals 200 participating in the chat system 1 (operation terminals 200A through 200C).

The operation terminal 200 is an example of an information processing apparatus, and is a computer, such as a PC, or an information processing terminal. The operation terminal 200 displays a screen on which messages exchanged in the chat system 1 are presented (hereinafter referred to as a chat screen) in a chronological order.

More specifically, the operation terminal 200 generates a message for operation terminals 200 participating in the chat system 1 in response to an operation of a user, and transmits the generated message to the server apparatus 100. The operation terminal 200 additionally displays on the chat screen as a new message thereon the message transmitted to the server apparatus 100. If the operation terminal 200 receives a message from the server apparatus 100, the operation terminal 200 additionally displays the received message on the chat screen thereof as a new message.

The network 300 is a communication system that is used for communication between the server apparatus 100 and the operation terminal 200. For example, the operation terminal 200 is the Internet, a public telephone network, and/or a local area network (LAN).

When the operation terminal 200 replies to one message in the chat system 1 thus constructed, the operation terminal 200 performs an association operation (link operation) to associate the one message with another message responsive to the message. If an image is included in the one message, a character string is received in a state that an original image associated with the image is displayed. The operation terminal 200 performs the association operation to associate the one message with the other message including the input character sting.

If the image included in the one message is part of another image, the other image (namely, the whole image) is the original image. However, if the image included in the one message is the whole image, the image included in the one message may match the original image.

A hardware configuration of the operation terminal 200 of the exemplary embodiment is described below. FIG. 2 illustrates the hardware configuration of the operation terminal 200 of the exemplary embodiment.

Referring to FIG. 2, the operation terminal 200 includes a central processing unit (CPU) 201 serving as an arithmetic unit, a memory 202, and a magnetic disk device 203. The CPU 201 executes a variety of programs including an operating system (OS), and applications. The memory 202 serves as a memory area that stores the variety of programs and data that is used to execute the programs. The magnetic disk device 203 serves as a memory area that stores the variety of programs, data that is input to the programs, and data that is output from the programs. The CPU 201 implements functionalities of the operation terminal 200 by loading the programs stored on the magnetic disk device 203 onto the memory 202, and executing the programs.

The operation terminal 200 further includes a communication interface 204 for communication with the outside, a display mechanism 205 including a video memory and a display, and an input device 206 including a keyboard, a mouse, and/or a touch panel. In accordance with the exemplary embodiment, the display 205 is an example of a display.

The server apparatus 100 may be identical in hardware configuration to the operation terminal 200 of FIG. 2.

Figure 3:
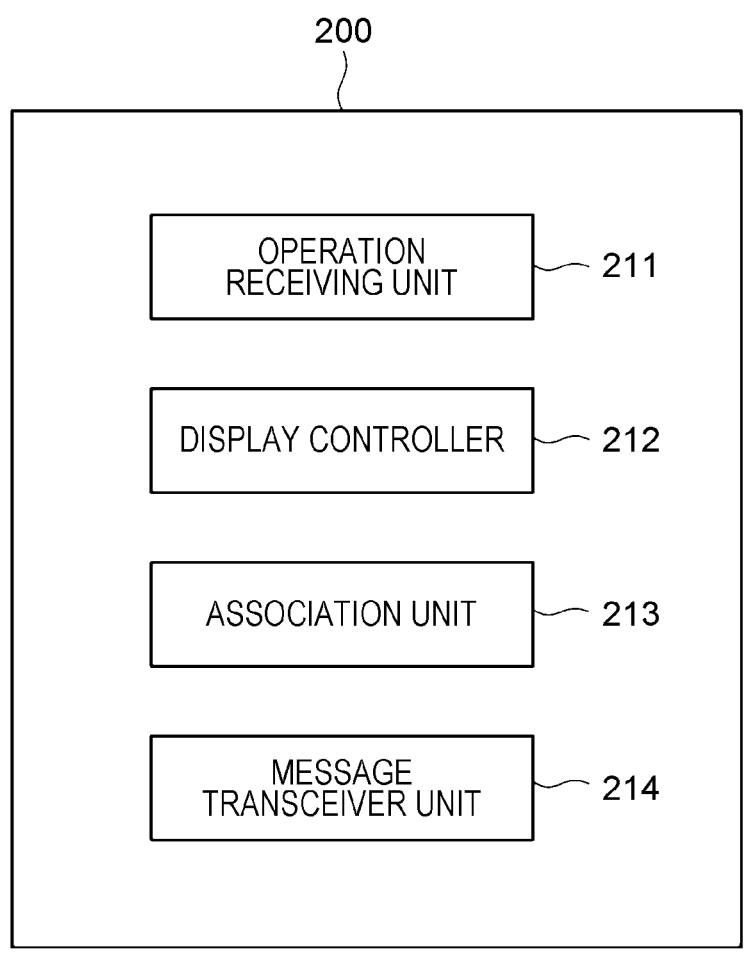
FIG. 3 is a functional block diagram illustrating the operation terminal of the exemplary embodiment.

The functional configuration of the operation terminal 200 of the exemplary embodiment is described below. FIG. 3 is a functional block diagram illustrating the operation terminal 200 of the exemplary embodiment. The operation terminal 200 includes an operation receiving unit 211, a display controller 212, an association unit 213, and a message transceiver unit 214.

The operation receiving unit 211 receives an operation performed on a mouse or a touch panel by the user. For example, the operation receiving unit 211 receives an operation to enter a character string included in a message to be transmitted, or an operation to transmit to the server apparatus 100 a message including the character string and an image (image data).

The operation receiving unit 211 also receives an operation to display an original image corresponding to the image via the image included in the one message on a chat screen. When the original image is displayed with the operation to display the original image performed, the operation receiving unit 211 receives an operation to enter a character string in reply to the one message with the original image displayed, or an operation to transmit another message including the input character string to the server apparatus 100.

The display controller 212, serving as an association unit, outputs data to display on the display the messages, images, and the chat screen on the display of the display mechanism 205. The display controller 212 thus controls a displaying operation of the display. When the operation to display the original image corresponding to the image via the image included in the one message on the chat screen is performed, the display controller 212 causes the original image to be displayed on the display.

The association unit 213 also serving as the association unit performs the association operation to associate the one message on the chat screen with the other message. More specifically, when a reply is transmitted in response to the one message, the association unit 213 generates information (hereinafter referred to as link information) indicating that the one message is associated with (linked with) the other message as a reply to the one message. In other words, the link information indicates that the other message is the reply to the message. If the one message includes an image on the chat screen, the association unit 213 performs an association operation that associates the one message with the other message including the character string entered with the original image being displayed via the image.

The message transceiver unit 214 may transmit or receive a message to or from the server apparatus 100. When the message transceiver unit 214 transmits a message (reply message) in reply to the one message on the chat screen, the message transceiver unit 214 attaches the link information to the reply message, and then transmits to the server apparatus 100 the reply message with the link information attached thereto. If a message received from the server apparatus 100 is a reply message responsive to the one message, the message transceiver unit 214 receives the link information together with the received message.

Each functionality of the operation terminal 200 is implemented when software and hardware resources operate in concert with each other. More specifically, when the operation terminal 200 is implemented using the hardware configuration of FIG. 2, the OS and application programs stored on the magnetic disk device 203 or the like are read onto the memory 202, and executed by the CPU 201. This implements the functionalities of the operation receiving unit 211, the display controller 212, the association unit 213, the message transceiver unit 214, and the like.

Figure 4:
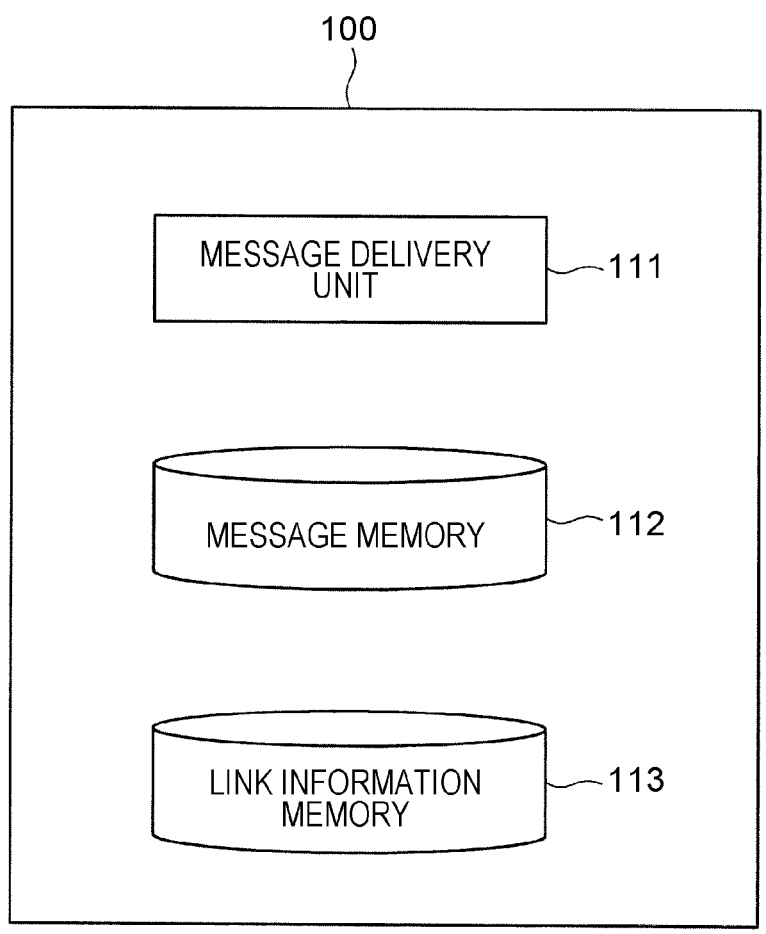
FIG. 4 is a functional block diagram illustrating a server apparatus.

The functional configuration of the server apparatus 100 of the exemplary embodiment is described below. FIG. 4 is a functional block diagram illustrating the server apparatus 100 of the exemplary embodiment. The server apparatus 100 of the exemplary embodiment includes a message delivery unit 111, a message memory 112, and a link information memory 113.

Upon receiving a message from the operation terminal 200, the message delivery unit 111 stores the received message on the message memory 112. The message delivery unit 111 transmits the received message to the operation terminals 200 that participate in the chat system 1. If the message received from the operation terminal 200 has the link information attached thereto, the message delivery unit 111 stores the link information on the link information memory 113, and stores the message on the message memory 112. Also, the message delivery unit 111 transmits the message with the link information attached thereto to the operation terminals 200 that participate in the chat system 1.

The message memory 112 stores the message received by the message delivery unit 111.

The link information memory 113 stores the link information received by the message delivery unit 111. The link information stored on the link information memory 113 may be used to classify or analyze the messages exchanged in the chat system 1.

As with the case of the operation terminal 200, the CPU in the server apparatus 100 reads an OS and application programs from a magnetic disk or the like onto a memory, and executes the OS and application programs. The server apparatus 100 thus implements the functionalities of the message delivery unit 111 and the like. The message memory 112 and the link information memory 113 are implemented by a storage device, such as a magnetic disk device.

Figure 5:
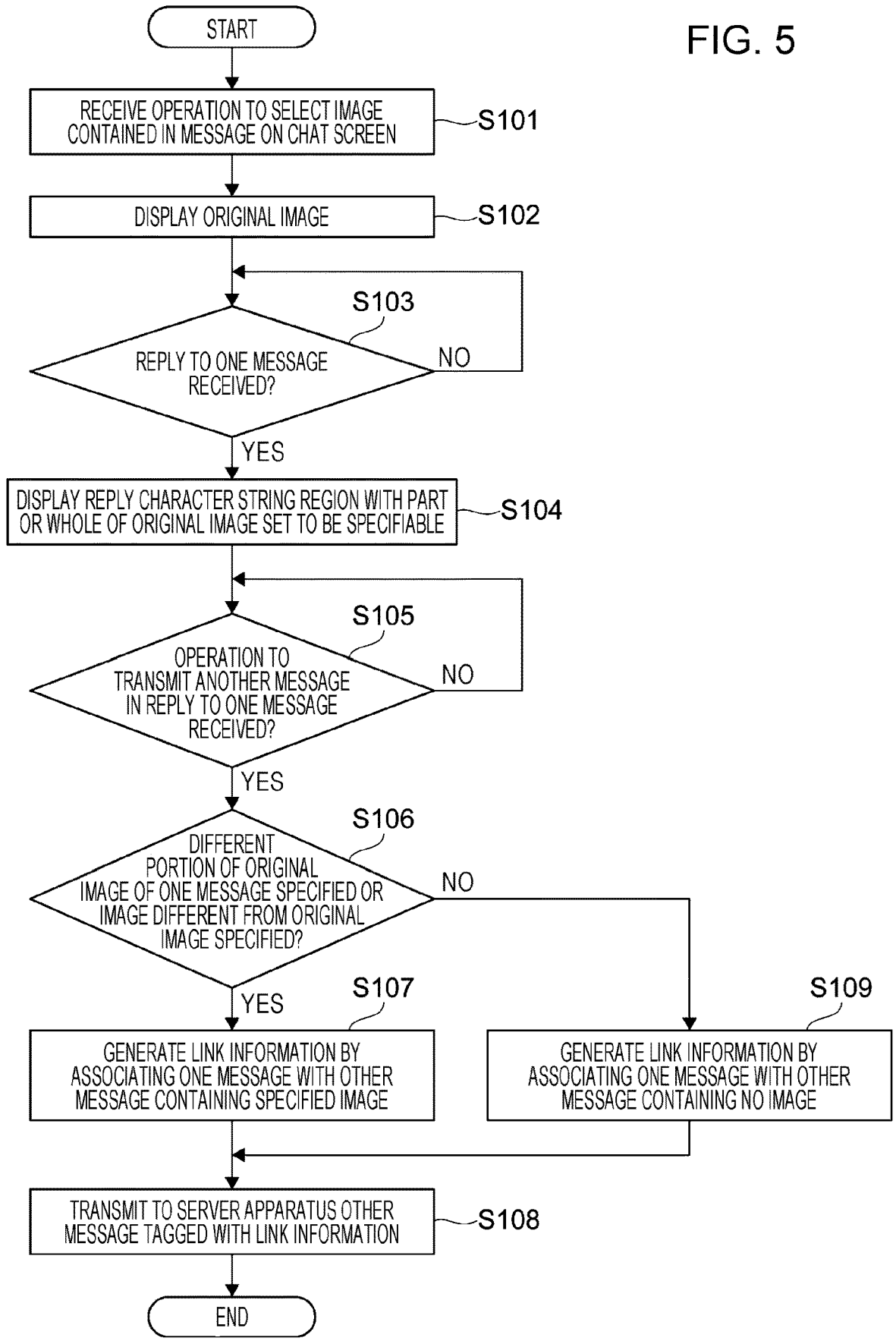
FIG. 5 is a flowchart illustrating an example of a process that generates link information by displaying the original image of an image if the image is contained in one message.

If an image is included in one message on the chat screen, an original image of the image is displayed to generate the link information. FIG. 5 is a flowchart illustrating an example of the process that generates the link information by displaying the original image of the image when the image is included in the one message.

The operation receiving unit 211 receives an operation to select the image included in the one message on the chat screen (step S101). That operation is performed to display the original image via the image included in the one message. For example, the operation may include clicking on the image included in the one message. The display controller 212 displays the original image (step S102).

The display controller 212 determines whether the operation receiving unit 211 has received a reply responsive to the one message (step S103). For example, the display controller 212 displays a reply button on a screen that displays the original image. The display controller 212 then determines whether an operation to select the reply button has been received.

If the determination result in step S103 is not affirmative, the determination in step S103 is repeated. In other words, if the determination result in step S103 is not affirmative, the display controller 212 displays the original image in an expanded size or a reduced size in response to an operation performed by the user until the reply to the one message is received. If the original image is a document of multiple pages, the display controller 212 turns to and displays the next page of the original image or turns to and displays the previous page of the original image in response to the operation of the user.

If the determination result in step S103 is affirmative, the display controller 212 sets part or whole of the original image to be specifiable on the screen where the original image is displayed. If the user performs the operation to specify part or whole of the original image, an image to be included in another message that is in reply to the one message is specified. In the state that the original image is displayed, the display controller 212 displays a region that receives a character string in reply to the one message (hereinafter referred to as a reply character string region) (step S104).

The association unit 213 determines whether the operation receiving unit 211 has received the operation to transmit the other message in reply to the one message (step S105). The other message includes the character string entered in the reply character string region and the image specified by the user (part or whole of the original image). The user may specify as an image to be included in the other message an image not related to the original image.

If the determination result in step S105 is not affirmative (no), the determination in step S105 is repeated. In other words, if the determination result in step S105 is not affirmative, the operation receiving unit 211 receives in response to the user's operation the operation to specify part or whole of the original image or the operation to enter the character string into the reply character string region until the operation to transmit the other message is received.

If the determination result in step S105 is affirmative, the association unit 213 determines whether a different portion of the original image of the one message or an image different from the original image of the one message is specified as an image to be included in the other message (step S106). However, the other message may include the same portion of the original image of the message.

If the determination result in step S106 is affirmative, the association unit 213 generates the link information by associating the one message with the other message including the specified image (step S107). The message transceiver unit 214 transmits the other message with the link information attached thereto to the server apparatus 100 (step S108). The process thus ends.

If the determination result in step S106 is not affirmative, the association unit 213 generates the link information by associating the message with the other message not including the image (step S109). Processing proceeds to step S108.

In step S108, the message transceiver unit 214 transmits to the server apparatus 100 not only the data of the image specified as the image of the other message but also the data of the original image of the image. In addition, when the data of the original image is transmitted to the server apparatus 100, the data of the original image is transmitted from the server apparatus 100 to each of the operation terminal 200. The operation terminal 200 may thus display the original image. If the original image of the image included in the other message is the same as the original image of the image in the one message, the data of the original image is transmitted via the one message to each operation terminal 200. For this reason, the data of the original image is not transmitted in the transmission of the other message, and information on the image of the other message (for example, information indicating what portion of the original image is to be displayed) may be transmitted. In such a case, the operation terminal 200 identifies the one message from the other message via the link information, and displays the image included in the other message with the original image of the image in the one message associated with the image in the other message.

Figures 1A, 6:
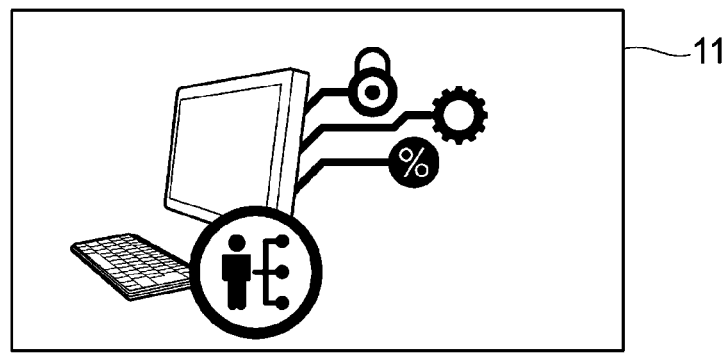
FIG. 6-1A through FIG. 6-1C illustrate a specific process that generates the link information by displaying the original image of the image if the image is contained in one message.
Figures 1B, 6:
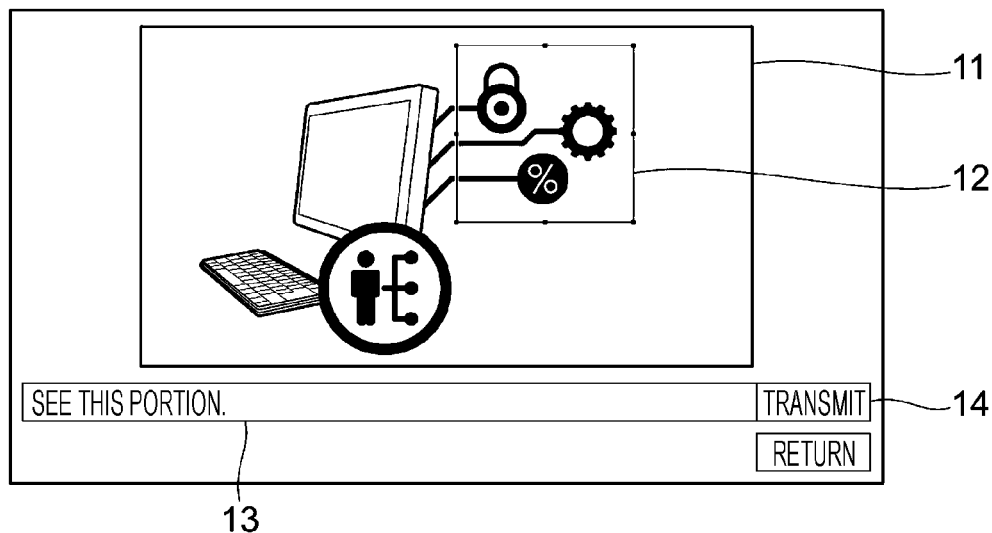

In the specific process described below, the link information is generated by displaying the original image of the image when the image is included in the one message on the chat screen. FIG. 6-1A through FIG. 6-3B illustrate the specific process that generates the link information with the original image of the image displayed when the image is included in the one message.

An operator A may now operate the operation terminal 200A to transmit a message including an image. To transmit the message, the operator A performs an operation to display an image 11 of FIG. 6-1A. Referring to FIG. 6-1B, the operator A specifies an image 12 that is part of the image 11. Note that the image 12 is part of the image 11 which is the original image of the image 12. The operator A enters a character string in a region 13 that receives the entry of the character string. Referring to FIG. 6-1B, a character string "See this portion." is entered.

When the operator A selects the image 11, a message 16 (see FIG. 6-1C) is transmitted to the server apparatus 100. The message 16 includes the chat screen "See this portion." entered by the operator A and the image 12 specified by the operator A. If the message 16 is displayed on the chat screen, the image 12 is also displayed. The message 16 transmitted to the server apparatus 100 includes not only the data of the image 12 but also the data of the image 11 as the original image. The server apparatus 100 transmits the received message 16 to operation terminals 200 participating in the chat system 1 (an operation terminal 200B and an operation terminal 200C).

Figures 1C, 6:
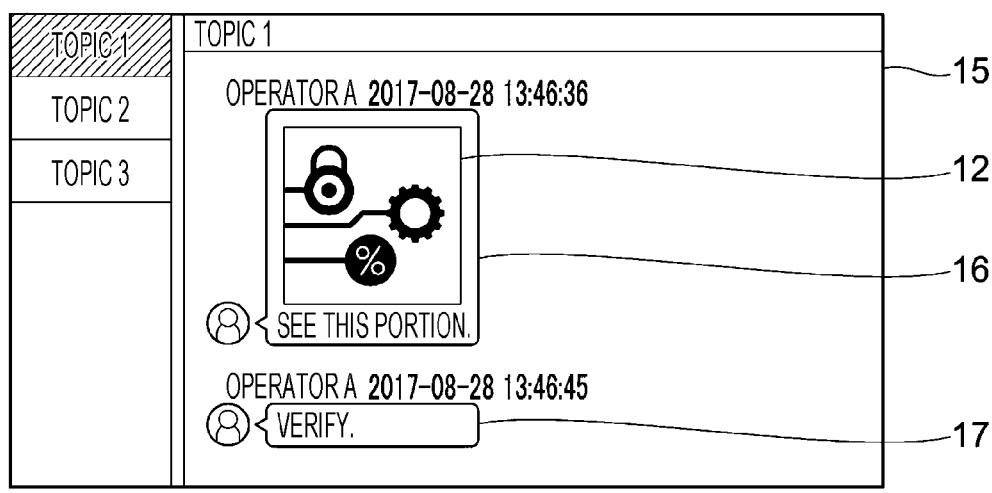

A chat screen 15 of FIG. 6-1C is an example of the chat screen displayed on the operation terminal 200B that has received the message 16 from the server apparatus 100. Note that a similar chat screen is displayed on the operation terminal 200A that has transmitted the message 16.

The chat screen 15 displays multiple messages. The multiple messages are displayed in a chronological order. For example, the latest message is displayed at the bottom of the screen, and then the messages subsequent to the latest message are displayed in a chronological order from bottom to top on the screen. In the example of FIG. 6-1C, the operation terminal 200A transmits a message 17 after transmitting the message 16, and the message 17 and the message 16 are displayed from the bottom in that order.

Figures 2A, 6:
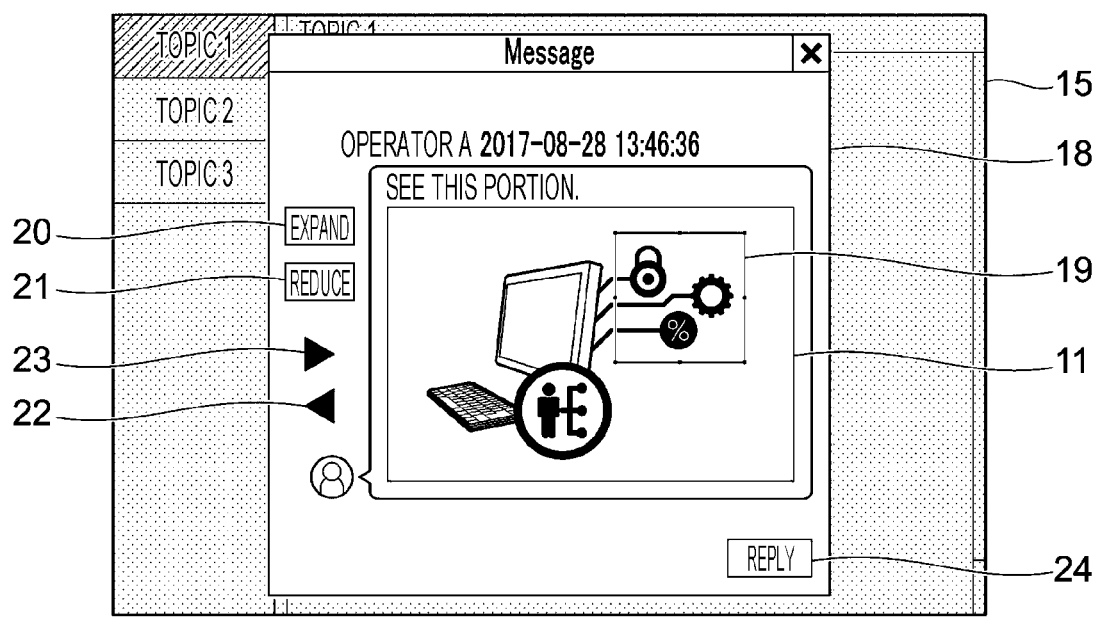

An operator B may now reply to the message 16. When the operator B selects the image 12 included in the message 16 on the chat screen 15, a screen 18 is displayed indicating the image 11 as the original image of the image 12 as illustrated in FIG. 6-2A. The screen 18 displays information about the sender (the operator A) of the message 16, transmission time, and the character string "See this portion." in the message 16. An image 19 indicating the frame indicative of the location of the image 12 in the image 11 is displayed such that it is recognized that the message 16 as an original message includes the image 12.

When the operator B selects an expand button 20, the image 11 is displayed in an expanded scale. If the operator B selects a reduce button 21, the image 11 is displayed in a reduced scale. When the operator B selects a next page button 22 with the image 11 being a document including multiple pages, the next page is displayed. When the operator B selects a previous page button 23, the screen returns to the previous page to display the previous page.

Figures 2B, 6:
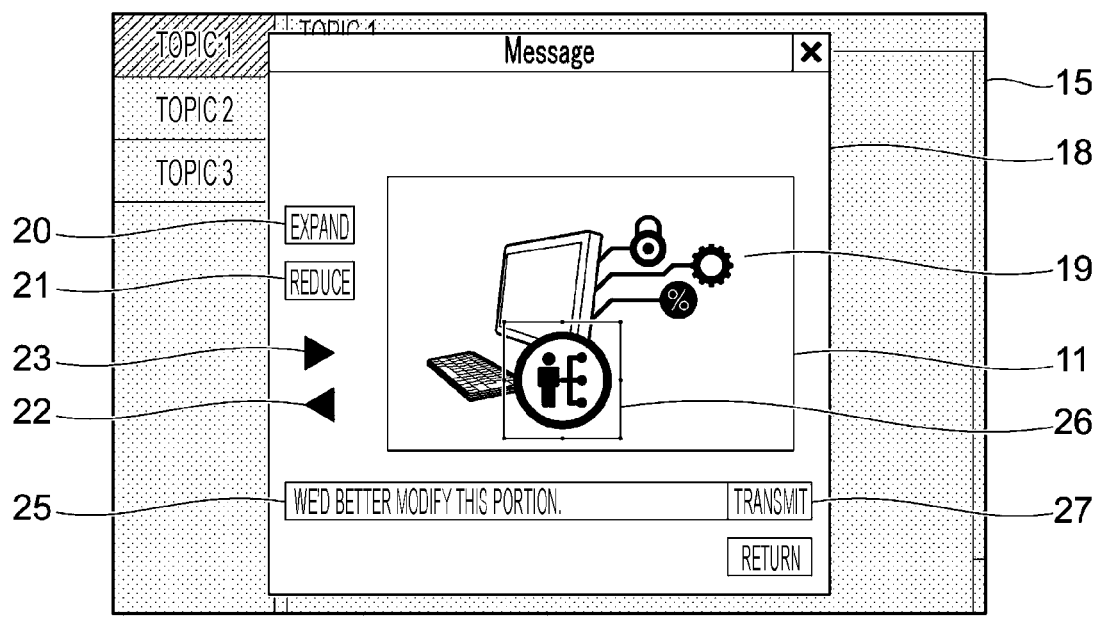

When the operator B selects a reply button 24, a reply character string region 25 is newly displayed as illustrated in FIG. 6-2B. Part or whole of the image 11 may be specifiable on the screen 18. In the illustrated example, the operator B specifies an image 26 that is part of the image 11. The image 26 is different from the image 12 included in the message 16 serving as the original message. When the operator B enters a character string in the reply character string region 25, the entered character string is displayed. As illustrated in FIG. 6-2B, a character string reading "We'd better modify this portion." is entered.

When the operator B selects a transmit button 27, the association unit 213 in the operation terminal 200B generates the link information. The association unit 213 herein generates the link information by associating the message 16 with a message 28 serving as a message in reply to the message 16 (see FIG. 6-3A). The message 28 includes the chat screen entered by the operator B "We'd better modify this portion." and the image 26 specified by the operator B. The link information indicates that the message 28 is the reply to the message 16.

The message 28 with the link information attached thereto is transmitted to the server apparatus 100. The message transceiver unit 214 transmits not only the data of the image 26 included in the message 28 but also the data of the image 11 as the original image. However, since the data of the image 11 is transmitted to the operation terminal 200 via the message 16, the data of the image 11 may not necessarily have to be transmitted via the message 28. Upon receiving the message 28 with the link information attached thereto, the server apparatus 100 transmits the received message 28 to the operation terminals 200 participating in the chat system 1 (the operation terminal 200A and the operation terminal 200C).

Figures 3A, 6:
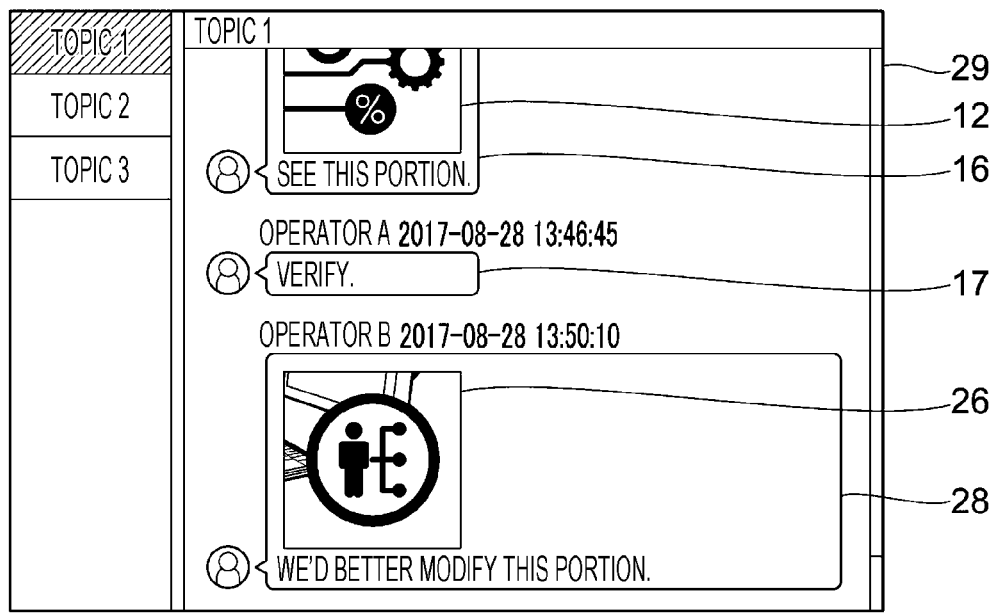
Figures 3B, 6:
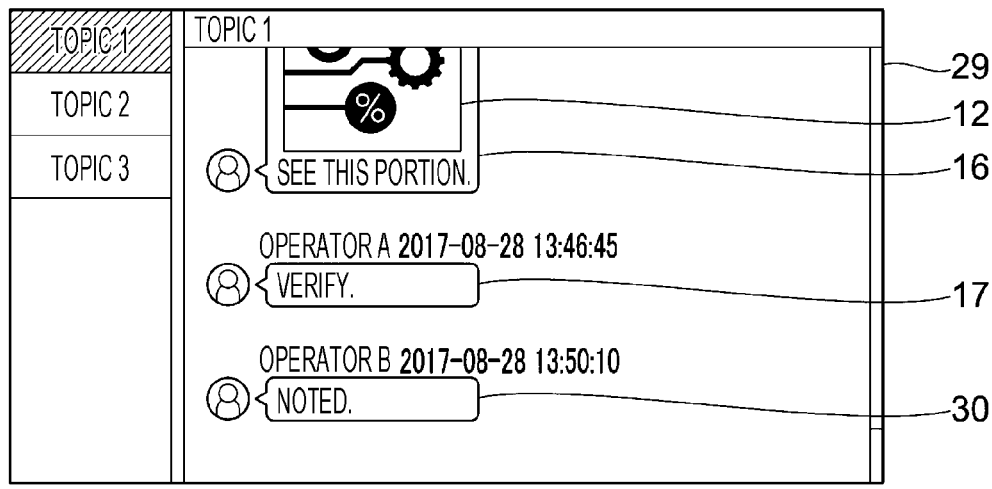

A chat screen 29 of FIG. 6-3A is an example of the chat screen displayed on the operation terminal 200A that has received the message 28 from the server apparatus 100. The operation terminal 200B having transmitted the message 28 also displays a chat screen similar to the chat screen 29.

The chat screen 29 displays the message 28 as a new massage subsequent to the message 17. The message 16 is associated with the message 28 by the link information generated by the association unit 213 in the operation terminal 200B. If the operator A selects the message 28, the message 16 is displayed in a state indicating that the message 16 is associated with the message 28. More specifically, if part of the message 16 is not displayed on the chat screen 29 as illustrated in FIG. 6-3A, the chat screen 29 is scrolled such that the whole message 16 is viewed. If the message 16 is displayed apart from the display region of the chat screen 29, the chat screen 29 may be scrolled such that the message 16 is entirely viewed.

Referring to FIG. 6-3A, the message 28 includes the image 26 different from the image 12 included in the original message 16. It is contemplated that the operator B does not specify the image different from the image 12. A message 30 of FIG. 6-3B includes the character string entered into the reply character string region by the operator B but does not include any image. The message 30 includes the chat screen "Noted." The association unit 213 in the operation terminal 200B generates the link information. Referring to FIG. 6-3B, the association unit 213 generates the link information by associating the message 16 with the message 30. The link information indicates that the message 30 is a reply to the message 16.

In this way, if the one message includes the image, the operation terminal 200 displays the original image via the image and receives the chat screen with the original image displayed. The association unit 213 thus generates the link information that associates the one message with the other message including the character string entered with the original image displayed.

A reply may be made to the other message that has been made in reply to the one message. In such a case, the association unit 213 generates the link information that associates the other message with the reply message. The message transceiver unit 214 then transmits the message with the link information attached thereto to the server apparatus 100. In that case, the message transceiver unit 214 may transmit, as the link information, the link information that associates the one message with the other message in addition to the link information that associates the other message with the reply message.

Other display examples of a message associated with the one message are described below. The message associated with the one message is a reply message responsive to the one message, and includes the character string that has been entered with the original image displayed via the image included in the one message. Note that an operation terminal 200 serving as a sender transmitting a message and an operation terminal 200 serving as a receiver receiving the message display chat screens similar to each other.

When a reply is made in response to an original message, the reply message includes a character string entered by an operator and an image specified by the operator. On the other hand, in a first display example, the reply message includes the contents of the original message in addition to the character string entered by the operator, and the image specified by the operator.

Figure 7A:
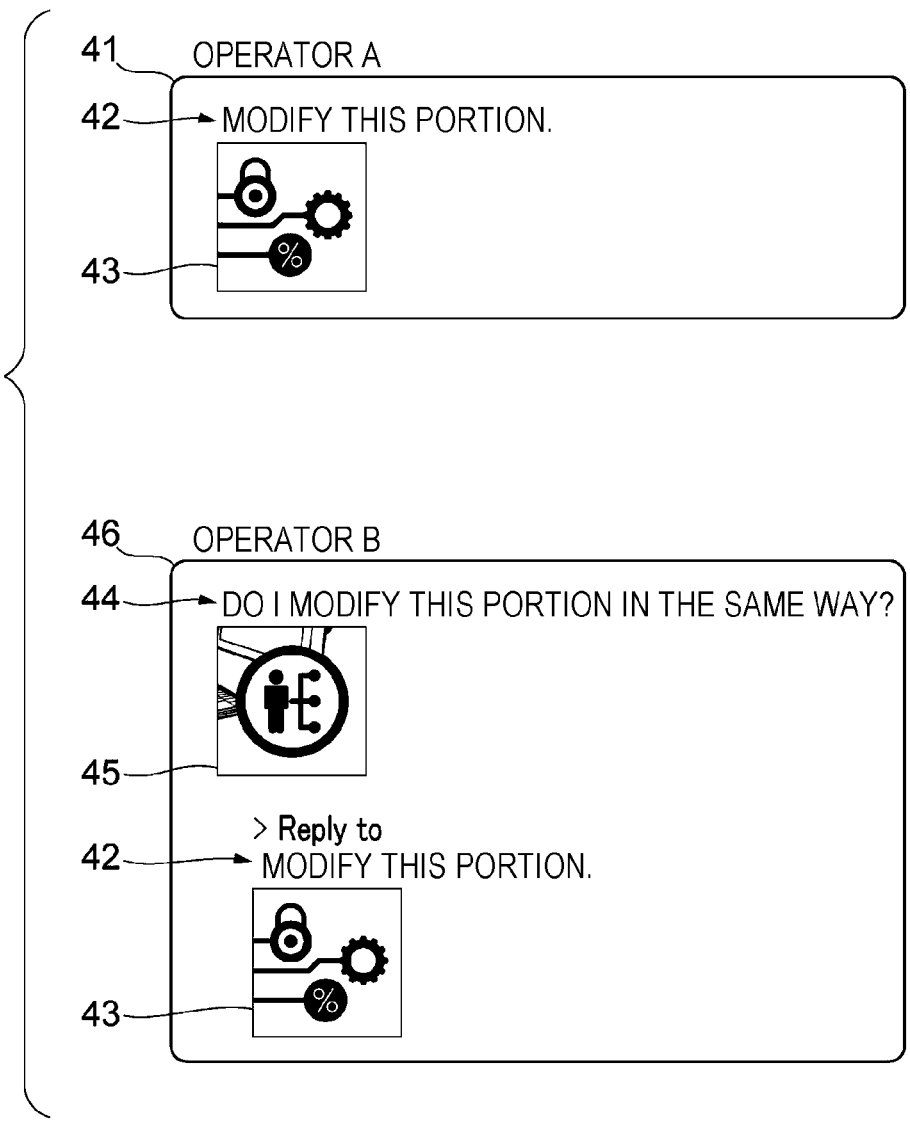
FIG. 7A and FIG. 7B illustrate a first display example of a reply message.
Figure 7B:
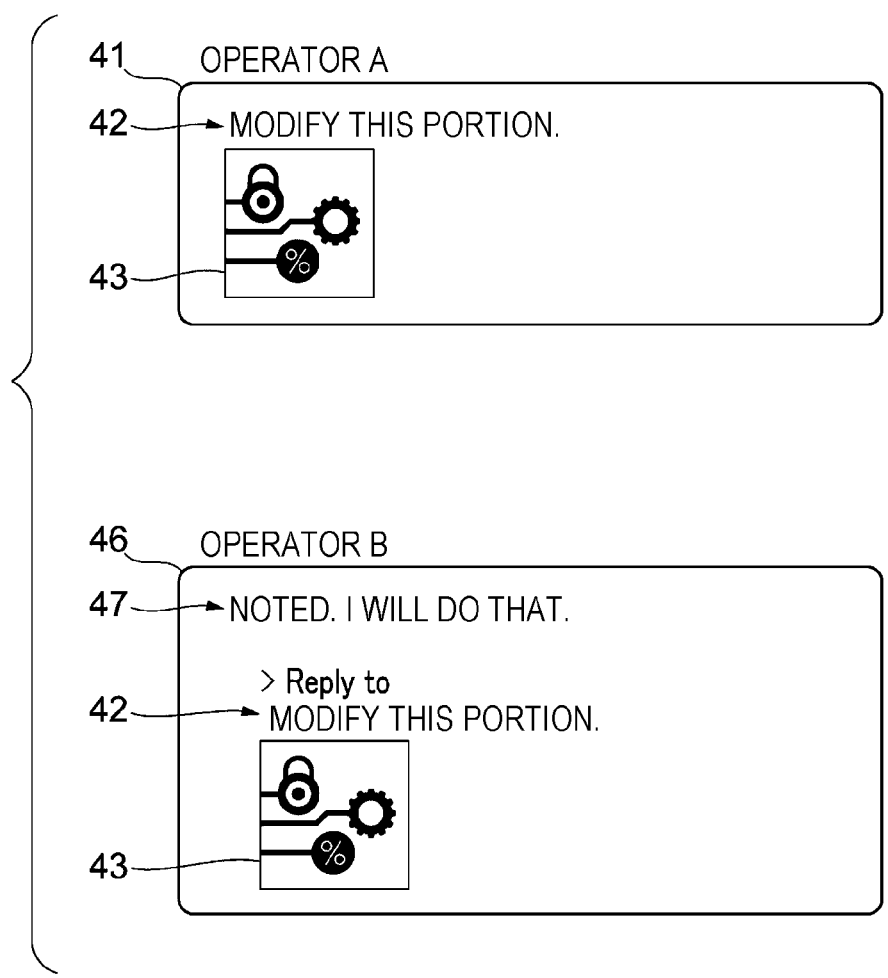

FIG. 7A and FIG. 7B illustrate a first display example of the reply message. The operator A may now transmit a message 41 by operating the operation terminal 200A. The original message 41 includes a character string 42 and an image 43. By operating the operation terminal 200B, the operator B transmits a reply message 46 containing a character string 44 and an image 45 including part of the original image of the image 43. Referring to FIG. 7A, the reply message 46 includes the character string 42 of the original message 41 and the image 43.

The reply message 46 includes the character string 42 of the original message 41 and the image 43. The contents of the original message 41 are recognized by verifying the reply message 46 without verifying the original message 41 on the chat screen.

If the operator A does not specify an image different from the image 43, a character string 47 of the reply message 46, the character string 42 of the original message 41, and the image 43 are displayed as illustrated in FIG. 7B.

If the contents of the original message 41 is to be included in the reply message 46, the contents of the original message 41 (character string and image) are also transmitted when the reply message 46 is transmitted from the operation terminal 200 to the server apparatus 100. Upon receiving the reply message 46 from the server apparatus 100, the operation terminal 200 displays the reply message 46 including the contents of the original message 41. Note that the original message 41 has been transmitted. For this reason, when the operation terminal 200 having received the reply message 46 displays, the operation terminal 200 identifies the original message 41 in accordance with the link information, and displays the reply message 46 with the contents of the original message 41 included therewithin.

The image 43 and the image 45 have the same original image. When the reply message 46 is transmitted from the operation terminal 200 to the server apparatus 100, the data of the original image may be transmitted for each of the image 43 and the image 45. Alternatively, the data of the original image may be transmitted as data common to the image 43 and the image 45. The data of the original image has been transmitted using the original message 41 as described above. The data of the original image may not necessarily have to be transmitted when the reply message 46 is transmitted. In such a case, the display controller 212 in the operation terminal 200 having received the reply message 46 may identify the original message 41 and the original image, based on the link information attached to the reply message 46.

A second display example is described below. As in the first display example, the reply message includes the contents of the original message. In the second display example, however, the display controller 212 controls a display form of the image of the original message in the reply message in accordance with the positional relationship between the original message and the reply message on the chat screen.

Figure 8B:
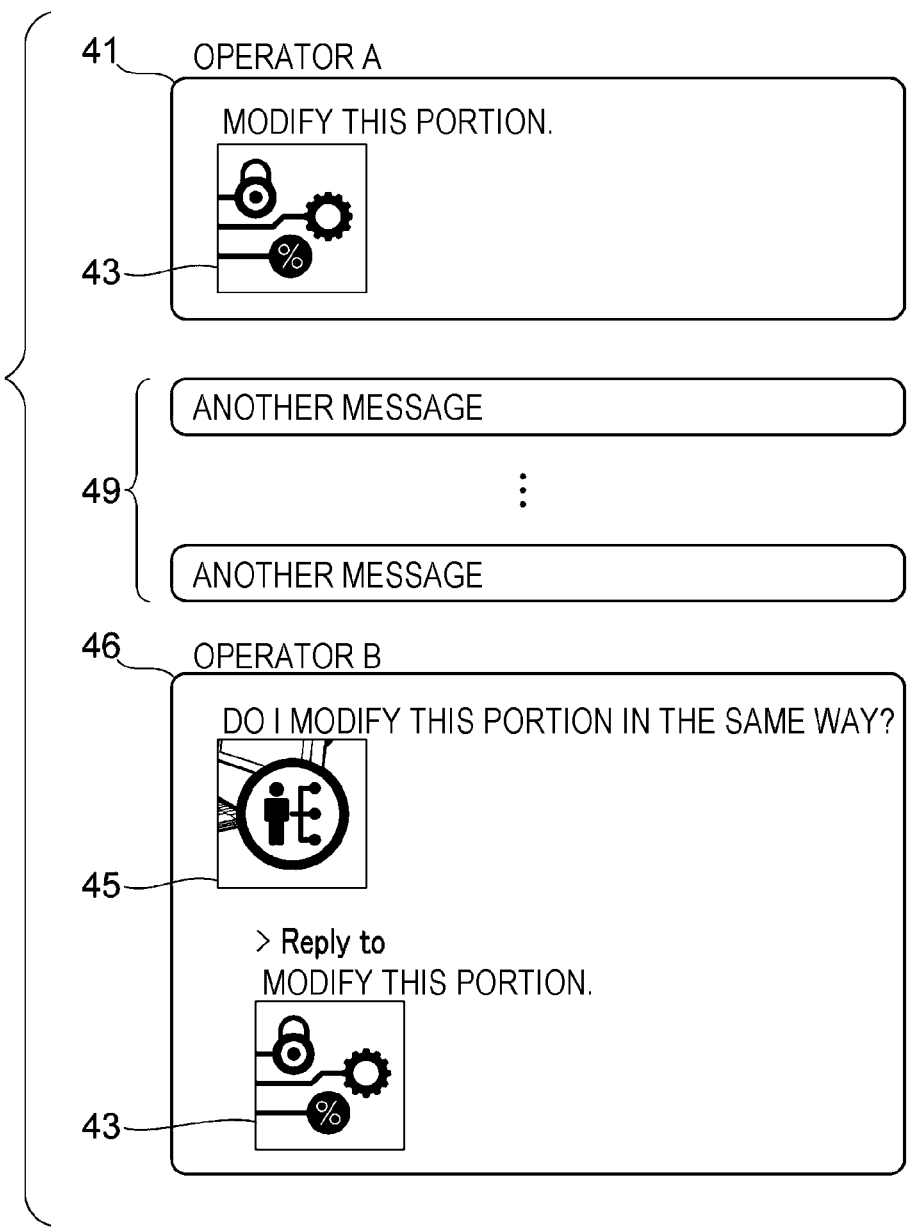

FIG. 8A and FIG. 8B illustrate a second display example of the reply message. Referring to FIG. 8A, another message 48 is present between the original message 41 and the reply message 46. Referring to FIG. 8B, multiple messages 49 are present between the original message 41 and the reply message 46. As the smaller number of messages is present between the original message 41 and the reply message 46, there is a higher possibility that the original message 41 is close to the reply message 46 in location. The original message 41 is thus easier to recognize from the display location of the reply message 46.

As the smaller number of messages is present between the original message 41 and the reply message 46 as illustrated in FIG. 8A and FIG. 8B in accordance with the exemplary embodiment, control is performed such that the image 43 of the original message 41 in the reply message 46 is displayed in a smaller size (or is not displayed). Control is performed such that the image 43 in the reply message 46 is displayed in a smaller size (or is not displayed) when the number of messages present between the original message 41 and the reply message 46 is smaller than a predetermined number than when the number of messages is equal to or larger than the predetermined number.

By displaying the image 43 in a smaller size, more messages are displayed on the chat screen.

In this way, the operation terminal 200 may control the display form of the image 43 of the original message 41 in the reply message 46 in accordance with the number of messages present between the original message 41 and the reply message 46.

Instead of using the number of messages present between the original message 41 and the reply message 46, the operation terminal 200 may control the display form of the image 43 of the original message 41 in the reply message 46 in accordance with a distance between the original message 41 and the reply message 46 on the chat screen. In that case, the operation terminal 200 performs control such that as the distance between the original message 41 and the reply message 46 is shorter, the image 43 in the reply message 46 is displayed in a smaller size (or is not displayed).

The operation terminal 200 may control the display form of the image 43 of the original message 41 in the reply message 46 in accordance with whether the original message 41 and the reply message 46 are accommodated within the chat screen. For example, the image 43 in the reply message 46 is displayed in a smaller size (or is not displayed) when both the original message 41 and the reply message 46 are accommodated within the chat screen than when one of the original message 41 and the reply message 46 is outside the display region of the chat screen and thus is not displayed.

The chat screen of the exemplary embodiment is not limited to the form of FIG. 8A and FIG. 8B where the messages are displayed in rows. Even if the messages are displayed in columns, the display form of the image of the original message in the reply message is controlled in accordance with the positional relationship between the original message and the reply message.

A third display example is described below. As in the first display example, the reply message includes the contents of the original message. In the third display example, however, the display controller 212 controls the display form of the image of the original message in the reply message in accordance with the number of reply messages associated with the original message.

Figure 9A:
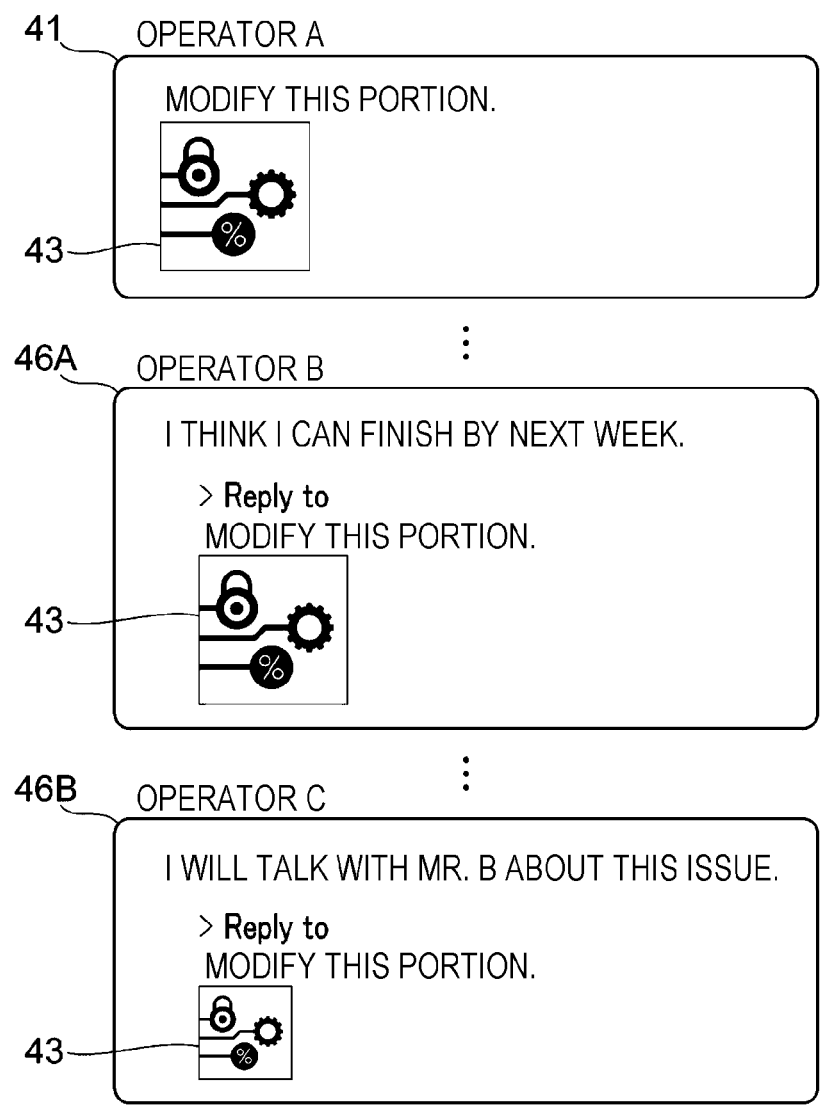
FIG. 9A and FIG. 9B illustrate a third display example of the reply message.
Figure 9B:
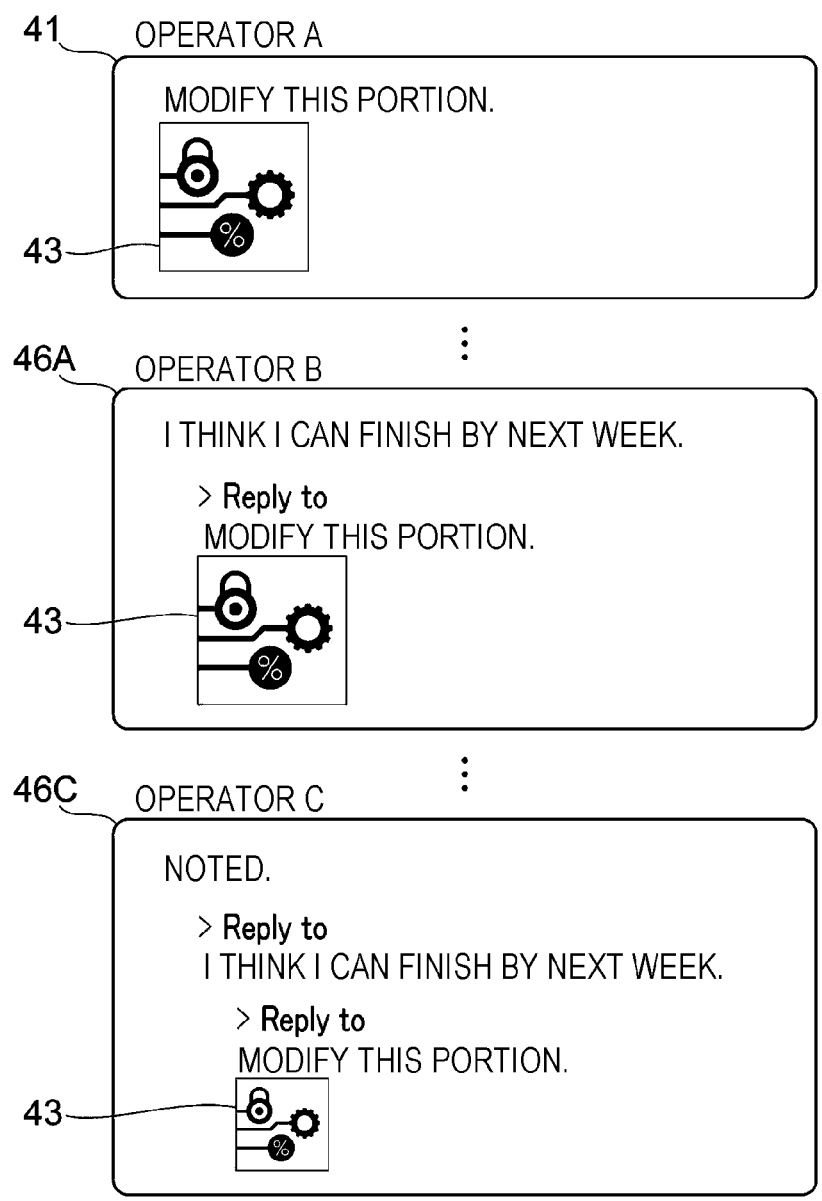

FIG. 9A and FIG. 9B illustrate the third display example of the reply message. Referring to FIG. 9A, the operator A may transmit the original message 41. In response to the original message 41, operators B and C respectively transmit a reply message 46A and a reply message 46B. Since multiple replies (two replies) are made in response to the original message 41, the image 43 of the original message 41 is displayed by multiple times. The operation terminal 200 performs control such that the image 43 of the original message 41 in the reply message 46 is displayed in a smaller size (or is not displayed) when the number of reply messages associated with the original message 41 is above a predetermined number than when the number of reply messages is equal to or below the predetermined number.

In the illustrated example, the predetermined number is "1". In addition, when the operator B transmits the reply message 46A, the number of messages associated with the original message 41 is "1". In that case, the number of messages does not exceed the predetermined number "1". However, if the operator C transmits the reply message 46B, the number of messages associated with the original message 41 is "2", and thus exceeds the predetermined number "1". The operation terminal 200 performs control such that the image 43 in the reply message 46B transmitted by the operator C is displayed in a smaller scale than the image 43 in the reply message 46A transmitted by the operator B.

The image 43 in the reply message 46A transmitted by the operator B and the image 43 in the original message 41 transmitted by the operator A are also displayed in a smaller scale (or are not displayed) when the number of messages associated with the original message 41 exceeds the predetermined number "1" than when the number of messages is equal to or below the predetermined number "1".

Referring to FIG. 9A, the reply is made to the original message 41. Referring to FIG. 9B, a reply message 46C is transmitted in response to the reply message 46A. In such a case, the reply message 46C includes the image 43 of the original message 41. The reply message 46C is handled as a reply message associated with the original message 41.

A fourth display example is described below. As in the first display example, in the fourth display example, the reply message includes the contents of the original message. In the fourth display example, however, the display controller 212 controls the display form of the image of the original message in the reply message in accordance with the number of operations performed to display the original message on the chat screen (the number of times by which the original message is displayed).

FIG. 10A and FIG. 10B illustrates the fourth display example of the reply message. The operator A may now transmit the original message 41, and the operator B may now transmit a reply message 48 in response to the original message 41. As illustrated in FIG. 10A, the original message 41 and the reply message 48 are displayed on the chat screen of each of the operation terminal 200A through the operation terminal 200C.

The operator A may display the original image of the image 43 by several times by selecting on the chat screen the image 43 in the original message 41 or the image 43 in the reply message 48. In that case, the operator A has apparently verified the original image or the image 43 by several times and has apparently recognized the contents of the original image or the image 43. If the number of times of displaying the original image exceeds the predetermined number, control is performed such that the image 43 in the original message 41 and the image 43 in the reply message 48 are displayed in a smaller scale (or are not displayed) as illustrated in FIG. 10B.

In the displayed example, the predetermined number is "5". The image 43 in the original message 41 and the image 43 in the reply message 48 are displayed in a smaller size when the number of times of displaying the original image exceeds "5" than when the number of times of displaying the original image is equal to or below "5".

The present invention is not limited to the method of modifying the display form of all the images 43 in the original message 41. For example, the display form of the image 43 in the original message 41 may be modified but the display form of the image 43 in the reply message 48 may remain unchanged. In the illustrated example, only the image 43 is included as an image of the reply message 48. But the reply message 48 may include an image that is different from the image 43 and is part or whole of the original image of the image 43. The number of times of displaying the original image may include the number of times of displaying when the image different from the image 43 is selected.

The number of times of displaying the original image via the image 43 may be counted by taking into account the number of times of displaying all messages, each including the image 43, or the number of times of displaying target messages only. For example, the number of times of displaying the original image via the image 43 of the original message 41 is not counted, but the number of times of displaying the original image via the image 43 of the reply message 48 is counted, and a determination is made as to whether the number of times counted exceeds the predetermined number. Also, for example, the number of times of displaying the original image via the image 43 of the message transmitted from a host terminal (the operation terminal 200) displaying the chat screen is not counted, but the number of times of displaying the original image via the image 43 of a message transmitted from another operation terminal 200 is counted, and then a determination is made as to whether the number of times counted exceeds the predetermined number.

The number of times of displaying the original image is information that serves as an index used to estimate the number of times by (the level of verification at) which the operator has verified the original message 41 or the image 43. In the illustrated example, the operator may simply use an index that allows the operator to estimate (identify) the number of times of verifying the original message 41 or the image 43. The index is not limited to the number of times of displaying the original image. For example, the index may be the number of times by which an operation has been made to the message including the image 43, or may also be the number of times by which the operator has clicked (selected) part or whole of the message including the image 43.

A fifth display example is described. In the fifth display example, the display controller 212 controls the display form of the original message in the reply message using the character string included in the reply message.

FIG. 11A and FIG. 11B illustrate the fifth display example of the reply message. Referring to FIG. 11A, the operator A transmits the original message 41, and the operator B transmits a reply message 49 in response to the original message 41. Referring to FIG. 11B, the operator A transmits the original message 41 and the operator B transmits a reply message 50 in response to the original message 41.

The reply character string responsive to the original message 41 is a character string 51 "Noted." in the reply message 49 of FIG. 11A. In view of the contents, the character string 51 is considered to be a reply to the sentence of the original message 41 (the character string 42) rather than a reply to the image 43 in the original message 41. As the contents of the original message 41, the reply message 49 includes the character string 42 (character string "Modify this portion.") but does not include the image 43.

The reply message 50 of FIG. 11B includes a character string 52 that is a reply to the original message 41, namely, a reply character "Do I change color on this portion?". In view of the contents, the character string 52 is considered to be a reply to the image 43 in the original message 41 rather than a reply to the sentence of the original message 41 (the character string 42). The reply message 49 includes the image 43 but does include the character string 42 (the character string "Modify this portion.").

Note that the operation terminal 200 stores a predetermined character string that is used to determine whether the reply is a reply to the image of the original message or a reply to the sentence of the original message. For example, "Noted", "OK", and "Understood" are character strings indicating an agreement and are predetermined as reply character strings in response to the sentences of the original message. On the other hand, character strings, such as demonstratives including "this" and "that", are predetermined as reply character strings responsive to the image of the original message.

The display controller 212 compares the character string of the reply message with the predetermined character string and then determines whether the character string of the reply message is a reply to the image of the original message or a reply to the sentence of the original message. If the display controller 212 determines that the character string of the reply message is a reply to the sentence, the display controller 212 does not display the image of the original message in the reply message. On the other hand, if the display controller 212 determines that the character string of the reply message is a reply to the image, the display controller 212 displays the image of the original message in the reply message.

The character string of the reply message may include a reply character string responsive to the sentence of the original message and a reply character string responsive to the image of the original message. If both are included, the character string of the reply message is considered to be a reply to the sentence and the image of the original message. The displaying of the image may have a higher priority, and the character string of the reply message may be determined to be a reply to the image of the original message. A threshold value may be set for the number of a specific character string, such as a demonstrative. If the character string of the reply message includes the number of the specific character strings above the threshold value, the character string of the reply message may be determined to be a reply to the image (or sentence) of the original message.

The display controller 212 may control the display form of the image of the original message in the reply message in accordance with the number of characters of the character string of the reply message. For example, if the number of characters of the character string of the reply message is smaller than a threshold value, the character string of the reply message may be a simple reply and may be determined to be a reply to the sentence of the original message.

Referring to FIG. 11A, the reply message 49 does not include the image 43 of the original message 41. Alternatively, the image 43 may be displayed in a smaller size. In other words, the display controller 212 of the exemplary embodiment performs control such that the image of the original message in the reply message is displayed in a smaller size when the character string of the reply message is a reply to the sentence of the original message (a reply not responsive to the image) than when the character string of the reply message is a reply to the image of the original message. In other words, the display controller 212 displays the image of the original message in the reply message in a larger size when the character string of the reply message is a reply to the image than when the character string of the reply message is a reply to the sentence of the original message (a reply not responsive to the image). Referring to FIG. 11B, the reply message 50 does not include the character string 42 of the original message 41. Alternatively, the character string 42 may be displayed together with the image 43 of the original message 41.

The display controller 212 may control the display form of the original message in the reply message in accordance with the character string included in the reply message in that way. In other words, the display controller 212 may change a display ratio of the image of the original message to the character strings of the original message in the reply message in accordance with the character strings included in the reply message.

In the second through fifth display examples, the operation terminal 200 serving as a receiver having received the reply message controls the display form of the image of the original message in the reply message. Alternatively, the operation terminal 200 serving as a sender that transmits the reply message may edit and transmit the image of the original message in the reply message or may instruct the receiver operation terminal 200 to edit and display the image of the original message. In the second display example, the number of messages between the original message 41 and the reply message 46 may be smaller than a predetermined number. In such a case, when the message transceiver unit 214 transmits the reply message 46 to the server apparatus 100, the message transceiver unit 214 may reduce the image 43 of the original message 41 in the reply message 46 in size before transmitting the image 43, or may instruct the receiver operation terminal 200 to display the image 43 in a smaller size.

In accordance with the exemplary embodiment, the display controller 212 in the operation terminal 200 displays the original image via the image included in the one message. The association unit 213 in the operation terminal 200 associates the one message with the other message including the character string that is entered with the original image displayed. When the operator enters the character string of the other message by verifying the contents of the original image of the image contained in the one message, the operator has difficulty in entering the character string if the original image is not displayed. When the one message including the image is associated with the other message, the operation terminal 200 thus receives the character string of the other message with the original image of the image displayed.

In the examples described above, the server apparatus 100 transmits the message received from an operation terminal 200 to each of all the operation terminals 200. Alternatively, the server apparatus 100 may process the message and transmit the processed message to each operation terminal 200. In the first display example, for example, the reply message may include the contents of the original message. The operation terminal 200 may transmit to the server apparatus 100 the reply message and the link information without the contents of the original message, and the server apparatus 100 may identify the contents of the original message, based on the link information, and may add the contents of the identified original message. In the second display example, if the number of messages between the original message and the reply message is smaller than the predetermined number, the server apparatus 100 may reduce the image of the original message in the reply message in size, or may instruct each operation terminal 200 to display the image of the original message in a smaller size.

In the examples described above, the messages are arranged on the chat screen in a chronological order. The display form of the messages is not limited to the chronological order. For example, the messages may be arranged in accordance with the degrees of importance attached to the messages, or the messages may be arranged on a per operator basis of the operators who have transmitted the messages.

In the examples described above, the association unit 213 generates the link information by associating the one message with the other message that is a reply to the one message. In accordance with the exemplary embodiment, the other message associated with the one message is not limited to a reply to the one message. It is contemplated that the one message may be transferred instead of a reply that is made to the one message. It may also be contemplated that after transmitting the one message including the image from the operation terminal 200A, the operator A generates and transmits another message using the one message. It may also be contemplated that the other message may be stored instead of being transmitted. In such a case, as well, the one message is associated with the other message including the character string that has been entered with the original image displayed via the image included in the one message.

The other message to be associated with the one message may be any message including a character string that has been entered in a state that the original image is displayed via the image included in the one message. The other message may be used in any applications. Through the operation that the original image is displayed via the image included in the one message (through the operation that the original message is displayed, based on the image included in the one message), the association unit 213 associates the one message with the other message.

In the examples described above, the server apparatus 100 transmits the message to the operation terminals 200 that participate in the chat system 1. Alternatively, the server apparatus 100 may transmit the message to a specified operation terminal 200. The chat system 1 may be a system that exchange messages on a one-to-one basis (one operation terminal 200 exchanges messages with another operation terminal 200). The chat system 1 of the exemplary embodiment is not limited to a system that exchanges messages on a real-time basis. The exemplary embodiment may find applications in a system as long as in a state that an original image is displayed via an image included in a message, the system receives another message.

A program implementing the exemplary embodiment of the present invention may be provided not only via communication but also by storing the program on a recording medium, such as a compact disk read-only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a display that displays a message from a sender; and
a processor configured to:
    receive a first data which is a portion specified from an original data by a sender and a second data which is the original data including the rest of the portion specified by the sender;
    control the display to display the first data and not to display the second data; and
    control the display to display the second data and a third data indicating a location of the portion of the first data in the second data if the processor receives a selection of the first data by a receiver.

2. The information processing apparatus according to claim 1, wherein the processor is configured to:
    associate the message including the first data with another message that includes a character string that is entered in a state that the second data is displayed via the first data on the display; and
    cause the character string and the first data associated with the second data to be displayed in the another message on the display.

3. The information processing apparatus according to claim 2, wherein the processor is configured to control a display form of the first data in the another message in accordance with a positional relationship between the message and the another message displayed on the display.

4. The information processing apparatus according to claim 3, wherein the processor is configured to control the display form of the first data in the another message in accordance with a distance between the message and the another message displayed on the display.

5. The information processing apparatus according to claim 3, wherein the processor is configured to control the display form of the first data in the another message in accordance with a number of a plurality of other messages presented between the message and the another message.

6. The information processing apparatus according to claim 2, wherein the processor is configured to control a display form of the first data in the another message in accordance with a number of a plurality of messages associated with the message.

7. The information processing apparatus according to claim 2, wherein the processor is configured to control a display form of the first data in the another message in accordance with a number of operations that have been performed on the message including the first data.

8. The information processing apparatus according to claim 7, wherein the processor is configured to control the display form of the first data in the another message in accordance with a number of operations that have been performed on the message including the first data to display the second data via the first data.

9. The information processing apparatus according to claim 8, wherein the processor is configured to control the display form of the first data in the another message in accordance with a number of operations that have been performed on a plurality of messages to display the second data via the first data.

10. The information processing apparatus according to claim 2, wherein the processor is configured to control a display form of the first data in the another message in accordance with the character string included in the another message.

11. The information processing apparatus according to claim 10, wherein the processor is configured to modify a display ratio of the first data to the character string of the message included in the another message in accordance with the character string included in the another message.

12. The information processing apparatus according to claim 11, wherein the processor is configured to perform display control such that the first data included in the another message is displayed in a larger size when the character string is a reply to the first data than when the character string is not the reply to the first data.

13. The information processing apparatus according to claim 1, wherein the another message includes a fourth data, the fourth data is part or whole of the second data different from the first data.

14. The information processing apparatus according to claim 13, wherein the fourth data is an image within a region specified by the receiver in the original image displayed via the first data included in the message.

15. The information processing apparatus according to claim 13, wherein the fourth data is associated with the second data of the first data included in the message.

16. The information processing apparatus according to claim 1, wherein the first data is displayed in a chat screen directly without a confirmation from the receiver to display the first data.

17. The information processing apparatus according to claim 1, wherein the processor is further configured to:
control the display to display the third data placed on the second data.

18. A non-transitory computer readable medium storing a program causing a computer to execute a process for processing information, the process comprising:
outputting data to display a message from a sender on a display;
receiving a first data which is a portion specified from an original data by a sender and a second data which is the original data including the rest of the portion specified by the sender;
controlling the display to display the first data and not to display the second data; and
controlling the display to display the second data and a third data indicating a location of the portion of the first data in the second data if a selection of the first data by a receiver is received.

19. The non-transitory computer readable medium according to claim 18, wherein the program causes the computer to execute the process for processing information, the process further comprising:
associating the message including the first data with another message that includes a character string that is entered in a state that the second data is displayed via the first data on the display; and
causing the character string and the first data associated with the second data to be displayed in the another message on the display.

20. An information processing apparatus, comprising:
display means for displaying a message from a sender; and
association means for receiving a first data which is a portion specified from an original data by a sender and a second data which is the original data including the rest of the portion specified by the sender, for controlling the display to display the first data and not to display the second data, and for controlling the display to display the second data and a third data indicating a location of the portion of the first data in the second data if the association means receives a selection of the first data by a receiver.

21. The information processing apparatus according to claim 20, further comprising:
associating means for associating the message including the first data with another message that includes a character string that is entered in a state that the second data is displayed via the first data on the display, and causing the character string and the first data associated with the second data to be displayed in the another message on the display.

\* \* \* \* \*